United States Patent [19]
Hampton

[11] 3,722,698
[45] Mar. 27, 1973

[54] CIRCULAR CLARIFIER MECHANISM

[75] Inventor: Quentin L. Hampton, Ormond Beach, Fla.

[73] Assignee: FMC Corporation, San Jose, Calif.

[22] Filed: Nov. 4, 1970

[21] Appl. No.: 86,892

[52] U.S. Cl. .....................210/525, 210/528, 417/90
[51] Int. Cl. ............................................B01d 12/00
[58] Field of Search..............210/524, 525, 528, 523; 417/90

[56] References Cited

UNITED STATES PATENTS

| | | | |
|---|---|---|---|
| 2,822,928 | 2/1958 | Wormser et al. | 210/523 |
| 2,262,412 | 11/1941 | Weinig | 210/528 X |
| 2,801,007 | 7/1957 | Thompson | 210/525 X |
| 3,234,880 | 2/1966 | Hampton | 417/90 |
| 3,327,867 | 6/1967 | Hikes | 210/525 |
| 3,396,102 | 8/1968 | Forrest | 210/525 |
| 3,526,591 | 9/1970 | Hampton | 210/525 |

*Primary Examiner*—Robert L. Lindsay, Jr.
*Attorney*—Dressler, Goldsmith, Clement & Gordon

[57] ABSTRACT

Apparatus for treating a liquid having settleable (sludge) and floating (scum) material therein to provide a clarified liquid, said apparatus including a cylindrical tank having a rotating mechanism therein for removing settled material from the bottom of the tank and for transporting floating material to a stationary radially extending trough. The mechanism is freely suspended within the tank, and is rotatably supported by structure that is disposed entirely above the liquid level. The mechanism is provided with generally radially disposed plow blades that sweep along the bottom of the tank, each blade including one or more pairs of converging sections that collect the settleable materials adjacent the junction of the converging sections. The inlet end of a pumping means is provided adjacent the junction of the converging sections of each blade, and the settled material is lifted upwardly through the center of the tank to discharge the material into an annular receptacle that is suspended from a support at the upper end of the tank above the liquid level. A scum outlet is provided in the bottom of the scum collecting trough and is connected to a scum discharge pump.

13 Claims, 4 Drawing Figures

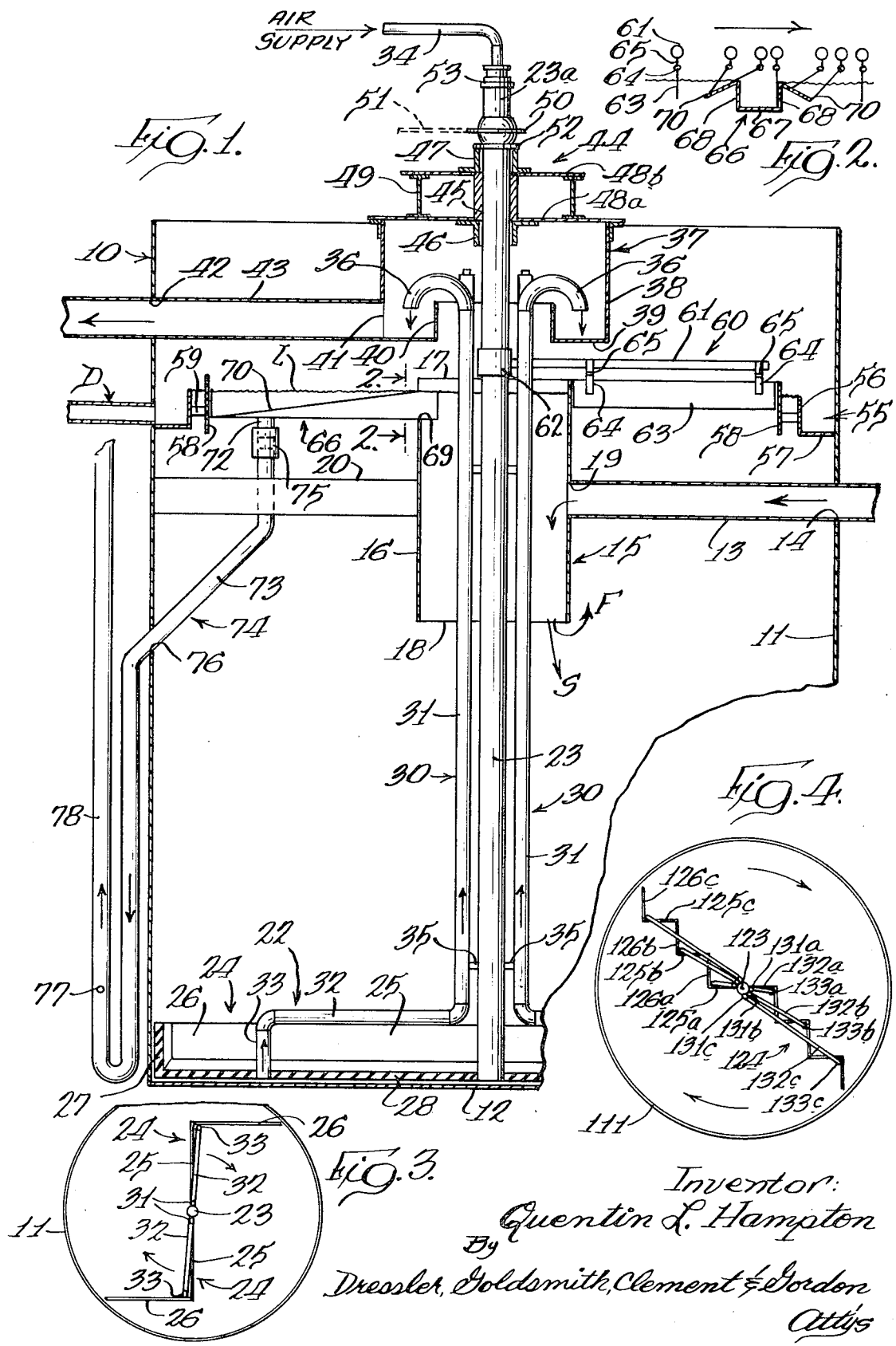

CIRCULAR CLARIFIER MECHANISM

BACKGROUND OF THE INVENTION

Sewage treatment apparatus including a tank having traveling structures therein for removing settled material (sludge) from the bottom of the tank and floating material (scum) from the top of the tank to provide a clarified liquid are well known in the art. Typical of such arrangements are the structures illustrated in my U.S. Pat. Nos. 3,132,733; 3,234,880 and 3,526,591, and in Forrest Pat. No. 3,396,102. The present invention specifically relates to an improvement upon the circular type of clarifying mechanism, such as that illustrated in FIGS. 6–9 of the above-mentioned Forrest patent.

In known types of circular clarifying mechanisms, it is conventional to provide a rotary mechanism in the center of the clarifying tank, with sludge collecting and removing means being provided at the bottom of the mechanism and scum removing means being provided at the surface level of liquid within the tank. Heretofore, all prior art devices have necessitated the use of bearings, supports, or similar structures that are subject to wear below the liquid surface, with the structures therefore being subject to the deleterious effect of the sewage within the clarifying tank. The sludge removal means of prior art clarifier mechanisms have also been less than satisfactory, since such means conventionally include only a single sludge inlet that is subject to blockage. The scum skimming mechanisms that have been utilized in prior art devices have also been less than satisfactory, since the inlet to the skimming mechanism has been concentrated at a single point, making the mechanism relatively inefficient in removing scum from the entire upper surface of the liquid within the clarifier tank.

BRIEF SUMMARY OF THE INVENTION

The present invention obviates the problems discussed above by providing a rotating sludge collecting and removing device that is suspended within a cylindrical clarifying tank by support structure that is positioned entirely above the upper surface of the liquid within the tank. The support means of the present invention provides a structure that is extremely reliable in operation, and which may be conveniently serviced from above the tank, when necessary.

The sludge collecting and removal mechanism of the present invention includes at least a pair of generally radially extending plow blades that include one or more pairs of converging sections, so that as the plows are rotated the sludge is accumulated at the junction of the converging blade sections. An individual positive acting sludge removal means is associated with each pair of converging sections of each blade. By having separate sludge removal means for each blade and plural sludge removal means for those blades having more than one pair of converging sections, the sludge removal mechanism remains operative, even though the inlet end of one of the sludge removal means may become blocked. The discharge of each individual sludge removal means is above the surface of the liquid within the tank, so that the discharge from each individual removal means can be observed and adjusted as necessary, without dewatering the tank.

The clarifier mechanism of the present invention also includes an improved scum skimming device for positively collecting and removing floating material from the surface of the liquid within the tank. In this regard, the present invention includes a fixed scum collection trough that extends generally radially of the tank throughout substantially the entire radius of the tank, and a blade that is fixed to the rotating sludge removal mechanism sweeps floating scum into the trough, which is continuously emptied by a pumping means.

BRIEF DESCRIPTION OF THE DRAWINGS

FIG. 1 is a central sectional view through a circular clarifying mechanism constructed in accordance with the teachings of the present invention with certain portions being broken away;

FIG. 2 is a sectional view taken generally along line 2—2 of FIG. 1 and illustrating the cooperative action between the scum collecting trough and the scum moving blade;

FIG. 3 is a reduced schematic plan view of the sludge collecting and removing means; and FIG. 4 is a view similar to FIG. 3 and illustrating a modified form of sludge collecting and removing means.

DETAILED DESCRIPTION

While this invention is susceptible of embodiment in many different forms, there is shown in the drawings and will herein be described in detail a preferred embodiment of the invention and a modification thereof, with the understanding that the present disclosure is to be considered as an exemplification of the principles of the invention and is not intended to limit the invention to the embodiments illustrated. The scope of the invention will be pointed out in the appended claims.

Turning now to FIG. 1 of the drawing, the tank of the clarifier mechanism of the present invention is illustrated generally at 10, and includes a vertically disposed cylindrical side wall 11 and a transversely extending bottom wall 12. While tank 10 has been illustrated as being formed of metal, it can also be formed of other materials, such as concrete. Conduit means 13 extends through an opening 14 in side wall 11 for introducing fluid having floating and settleable material therein into the interior of the tank 10.

An influent well 15 is provided centrally within tank 10 and is defined by a cylindrical wall 16 that is concentric with side wall 11. As is evident from FIG. 1, the upper end 17 of wall 16 is disposed above the upper surface of the liquid L within tank 10, while the lower end 18 of wall 16 is disposed a substantial distance therebelow. An opening 19 is provided in the midportion of inner wall 16 in radial alignment with the opening 14 in side wall 11, and pipe 13 is fixedly mounted in openings 14 and 19, as by welding, to provide support for the influent well 15. A further support is provided for influent well 15, and illustratively the further support may be in the form of a radially extending pipe section 20 that is fixed between inner wall 16 and side wall 11. Pipe section 20 is preferably disposed in alignment with pipe section 13. It has been found that pipe sections 13 and 19 provide adequate support for the influent well in tanks up to 50 feet in diameter. In larger tanks, up to 120 feet in diameter, two simple truss structures can be utilized to support the influent well. As is evident from the directional arrows in FIG. 1, the liquid passing inwardly of side wall 11 through pipe section 13 flows downwardly within inner wall 16, and the floating material F rises upwardly to the top surface of the liquid, while the settleable materials S sink to the bottom of the tank.

A sludge collecting and removing mechanism 22 is rotatably suspended centrally within tank 10, and the mechanism 22 includes support means in the form of a vertically extending hollow tube 23 that extends above the upper end of tank 10 where it is supported and driven by means to be hereafter described. The sludge collecting and removing means 22 includes at least a pair of steel plow blades 24 that are generally V-shaped in plan view (FIG. 3). Each blade 24 includes a section 25 that extends radially outwardly from the lower end of tube 23, and a further blade section 26 that extends outwardly at an angle with respect to the outer end of blade sections 25. The included angle between converging blade sections 25 and 26 is shown as about 90°, but it should be understood that the present invention is not limited to any specific angle.

Upwardly extending neoprene edges 27 are secured to the upright edges of blade sections 26, and neoprene edges 28 are secured to the lower end of blade sections 25. Thus, when tube 23 is rotated in a clockwise direction as indicated by the directional arrows in FIG. 3, edges 27 and 28 are positioned in sludge scraping relationship with respect to side wall 11 and bottom wall 12, respectively, and the sludge that settles at the bottom of the tank 10 will be collected adjacent the converging portions 25 and 26 of each blade 24.

The sludge removal means 22 also includes an air pump means 30 for the converging portions of each blade 24, and herein each air pump means includes a vertically extending section 31 supported from tube 23, a horizontal section 32 extending radially outwardly from the lower end of section 31, and a short vertically extending section 33 extending downwardly from the outer end of section 32. Sections 33 are disposed adjacent the junction of the converging portions of each blade 24, and the lower end of each section 33 is open to provide a sludge inlet to the air pump means 30. Air under pressure is communicated to tube 23 from a conduit 34 at the upper end 23a thereof, and communication is established between tube 23 and the lower end of pump sections 31 through connectors 35. The upper ends of pump sections 31 communicate with outwardly curved discharge portions 36 that discharge sludge into a centrally disposed receptacle means 37 that is suspended beneath support structure at the upper end of tank 10.

Receptacle means 37 is defined by a vertical outer wall 38, an annular transversely extending bottom wall 39 and a vertical inner wall 40 that extends upwardly from the inner end of bottom wall 39. An opening 41 is provided in the lower end of outer side wall 38, and is positioned in radial alignment with an opening 42 in the side wall 11 of tank 10. A sludge return conduit 43 is secured within openings 41 and 42 for receiving sludge from the receptacle means 37 and transporting it to a desired point of discharge. While the specific sludge removal means illustrated in the drawing shows the sludge being discharged through the side wall 11 of the tank 10, the invention also comprehends that the sludge can be removed by conduit means disposed above the upper end of the tank.

As mentioned above, the sludge collecting and removing means 22 is suspended within tank 10 by support structure that is positioned entirely above the upper level of liquid L within the tank, and said support means is indicated generally at 44 in FIG. 1. The upper end 23a of the support tube 23 extends upwardly through a central opening 45 in a lower bearing support plate 48a, and tube 23 is rotatably supported in a pair of vertically spaced sleeve-like bearings 46 and 47. Bearing 46 is a flanged member that is preferably bolted, or otherwise suitably secured, to the undersurface lower support plate 48a. Bearing 47 is also a flanged member that may be bolted, or otherwise suitably secured, to an upper bearing support plate 48b that is mounted in spaced parallel relationship with respect to the lower bearing support plate 48a. The entire support structure is carried by a pair of spaced, parallel I beams 49 that extend transversely above the top of the tank, and support plate 48a is secured to the lower flanges of beams 49, while support plate 48b is secured to the upper flanges of beams 49.

A sprocket 50 is fixed to the upper end 23a of tube 23 for rotating the sludge collecting and removing mechanism, and sprocket 50 is driven by a chain 51 that cooperates with a further sprocket (not shown) on the output shaft of a drive motor (also not shown). A thrust washer 52 surrounds tube 23 below sprocket 50 and engages the upper end of bearing 47 to support the weight of the sludge removing and collecting mechanism 22. As mentioned above, air is supplied to the air lift pumping means through a conduit 34 that communicates with the upper end 23a of tube 23, and an air seal gland 53 preferably seals the junction between tube 23 and conduit 34.

An effluent weir 55 is provided within tank 10 adjacent the upper level of liquid L therein, and the effluent weir is defined by an upright intermediate wall 56 that is disposed concentrically with respect to the side wall 11 of the tank 10. A bottom member 57 extends perpendicularly outwardly from the lower end of wall 56, and is secured to the tank side wall 11. As is apparent, the clarified liquid flows outwardly over the upper end of wall 56 into the chamber defined between wall 56 and the side wall 11 of the tank, and clarified liquid is withdrawn from the tank 10 through a discharge conduit D.

A further annular baffle wall 58 is positioned concentrically inwardly of wall 56, and is connected thereto by a plurality of circumferentially spaced, radially extending braces 59. Wall 58 extends from above to below the level of liquid L within the tank 10, and functions as a scum baffle to prevent floating material from passing outwardly over the effluent weir with the clarified liquid. The space between wall 58 and the wall 16 which defines the influent well also provides a confined area for collecting and removing floating material, and the means for collecting the floating material is indicated generally at 60.

The scum collecting mechanism 60 includes an arm 61 that extends radially outwardly from tube 23 above the level of liquid L within tank 10, with the inner end of arm 61 being connected to tube 23 by a collar 62 and a shear pin (not shown). A radially extending blade 63 is suspended below arm 61, and blade 63 preferably includes brackets 64 adjacent opposite ends thereof that are hingedly connected to spaced mounting lugs 65 on arm 61 so that the blade 63 is free to pivot relative to the arm 61. As is evident from FIG. 1, blade 63 extends from above to below the level of liquid within the tank 10, and spans substantially the entire radial distance between walls 16 and 58. Thus, as the tube 23 is rotated, the blade 63 will sweep across the upper surface of the liquid L, and will push floating material circumferentially around the tank 10.

The scum collecting means includes an upwardly open trough illustrated generally at 66 which includes a horizontally disposed bottom member 67 and upright side walls 68. As is evident from FIG. 2, trough 66 extends radially inwardly through an opening 69 (FIG. 1) in wall 16 to remove floating material from the influent well 15, although this is not essential to the proper functioning of the apparatus. The trough 66 is preferably secured, as by welding, between walls 16 and 58, and as the blade 63 rotates past the trough, the floating material is conveyed into the trough. Downwardly inclined flanges 70 extend outwardly from the upper end of each trough side wall 68, and flanges 70 taper from a high point adjacent wall 16 to a low point adjacent wall 58, as is evident from FIG. 1. By virtue of the downward taper, the leading flange 70 on trough 66 cooperates with the blade 63 to allow the floating scum to be gradually swept into the trough 66. As is evident from FIG. 2, blade 63 pivots as it rides up the leading flange 70 and gradually sweeps the scum into the trough 66. Once the blade 63 clears the leading side edge 68 of the trough, it resumes a vertical disposition, and further movement of the arm 61 causes the blade 63 to strike the trailing upright side wall 68 of the trough with sufficient force to dislodge any material that adheres to the blade 63. The trailing inclined flange 70 allows the blade 63 to gradually re-enter the liquid L without splashing or otherwise upsetting the upper surface of the liquid. Once the arm 61 clears the trough 66, the blade 63 resumes its vertical disposition and its scum transporting function.

A scum outlet 72 is provided in the lower wall 67 of the trough 66, and outlet 72 is connected to the conduit 73 of a scum discharge air pump means 74 by a flexible coupling 75. Conduit 73 passes through an opening 76 in the side wall 11 of tank 10, and air under pressure is admitted to the pump means 74 through an opening 77 in an upright conduit section 78 so that the scum is removed in the direction of the arrows in FIG. 1. Since the scum collecting trough 66 extends inwardly into the influent well 15, a box-like weir is provided and any material that is floating on the upper surface of the liquid within the influent well will be drawn downwardly into conduit 73 by the pumping means 74 thereby preventing a build up of material in the influent well.

Referring now to FIG. 4, a modified form of sludge collecting and removing means 122 is illustrated that has particular utility in relatively large diameter tanks. A pair of blades 124 extends generally radially outwardly from a centrally disposed support and air supply tube 123. Each blade 124 includes a plurality of pairs of converging sections 125a–126a, 125b–126b and 125c–126c, three pairs having been shown for purposes of illustration only, it being understood that the invention is not limited to any specific number of blades. An independent sludge removal means is provided for each pair of converging blade sections, and as in the previous embodiment, each such means includes a vertical inner section 131a, 131b and 131c; a horizontally disposed outwardly extending section 132a, 132b and 132c; and a downwardly extending inlet section 133a, 133b and 133c. By providing multiple collection zones on each blade, and independent removal means for each collection zone, efficient sludge removal is obtained even in tanks of large diameter.

I claim:

1. Apparatus for treating sewage comprising: a tank including a side wall and a bottom wall extending transversely with respect thereto; means for introducing into said tank a liquid having settleable and floating material therein, said settleable material falling to the bottom of the tank and said floating material rising to the top of the tank; support means fixed at the top of the tank above the level of liquid therein; means for collecting and removing settled material from the bottom of said tank, said collecting and removing means including a hollow tube having its lower end disposed adjacent said bottom wall, said tube being disposed along the axis of said side wall and being connected to an air supply source, at least one sludge pick-up member connected to said tube for rotation therewith, said sludge pick-up member having an inlet end adjacent said bottom wall, an outlet end above the liquid level, and an intermediate portion communicating with the interior of said tube for applying a suction to the inlet end and for pumping sludge outwardly of said outlet end; means adjacent the upper end of said hollow tube mounting said collecting and removing means for rotation on said fixed support means, said mounting means being positioned completely above the liquid level and said mounting means being the sole support for said collecting and removing means whereby said collecting and removing means is freely suspended in said tank; and receptacle means carried by said support means above the liquid level, said receptacle means being an annular chamber defined by a cylindrical outer wall having its upper end secured to said support means, an annular bottom wall extending perpendicular inwardly from said outer wall, and an inner wall extending upwardly from said bottom wall with the upper end of said inner wall being spaced from said support means, said tube and said pick-up member extending upwardly through said annular chamber, the outlet end of said pick-up member extending outwardly over the upper end of said inner wall to discharge sludge into said chamber.

2. Apparatus as set forth in claim 1 in which said collecting and removing means includes at least a pair of sludge pick-up members connected to said tube for rotation therewith.

3. Apparatus as set forth in claim 2 in which said collecting and removing means further includes a blade associated with each pick-up member, each blade including at least one pair of portions that converge toward one another in the direction of rotation; and wherein tank scraping means is provided on each blade for collecting sludge at the junction of each pair of converging blade portions as said collecting and removing means rotates.

4. Apparatus as set forth in claim 3 wherein the suction end of each pick-up member is positioned adjacent the junction of a pair of converging blade portions.

5. Apparatus as set forth in claim 2 including means for removing floating material from the upper surface of the liquid within the tank.

6. Apparatus as set forth in claim 5, in which said means for removing floating material includes a scum collection trough, means supporting said trough within said tank adjacent the liquid level, means for withdrawing scum from said trough, and blade means connected to said tube for rotation therewith, said blade means extending from above to below said liquid level for transporting floating material circumferentially of said tank and into said trough during rotation of said blade means.

7. Apparatus as set forth in claim 6 in which said trough includes side walls extending upwardly from a bottom wall, and inclined flanges extending downwardly from the upper end of each trough side wall.

8. Apparatus as set forth in claim 7 in which the radially inner end of said trough projects inwardly of said inner wall.

9. A tank for use in treating sewage comprising: a generally cylindrical side wall and a bottom wall extending transversely with respect thereto; conduit means extending inwardly of said side wall for discharging liquid having floating and settleable material into the central portion of the tank; a cylindrical inner wall within said tank in concentric relationship with the side wall thereof, the upper end of said inner wall being positioned below the upper end of the tank side wall and above the level of liquid within the tank, the lower end of said inner wall being positioned above the tank bottom wall, said inner wall being supported by said conduit means and having a liquid transferring opening therein so that said inner wall provides a fixed influent well; a first intermediate wall between said inner wall and said tank side wall and concentric therewith, the upper end of said first intermediate wall being positioned below the level of the upper end of said inner wall and at the level of liquid within the tank to provide an effluent weir outwardly of said first intermediate wall into which clarified liquid flows, the bottom of said effluent weir being closed by a wall extending outwardly from the lower end of said first intermediate wall and connected to the side wall of said tank; a second intermediate wall between said inner wall and said first intermediate wall and concentric therewith, the upper end of said second intermediate wall being positioned above the upper end of the first intermediate wall to provide a scum baffle; means connecting said second intermediate wall to one of said other walls; support means above said inner wall with means to support a skimming blade between said inner wall and said second intermediate wall; and an upwardly open, radially extending trough secured between said second intermediate wall and said inner wall, the radially inner end of said trough projecting inwardly of said inner wall for removing floating material from said influent well.

10. A tank as set forth in claim 9 in which said conduit means is defined by a pipe section extending radially between said inner wall and said tank side wall, there being a further pipe section diametrically aligned with said first pipe section and secured to said inner wall and said tank side wall to provide additional support for said influent well.

11. A tank as set forth in claim 9 in which said trough includes side walls extending upwardly from a bottom wall, and inclined flanges extending downwardly from the upper end of each trough side wall.

12. A tank as set forth in claim 11 in which the side walls of said trough taper downwardly from a high point adjacent said inner wall to a low point adjacent said second intermediate wall.

13. Apparatus for treating sewage comprising: a tank including a generally cylindrical side wall, a bottom wall extending transversely with respect thereto, and a generally cylindrical inner wall supported within said tank in concentric relationship with the side wall thereof, the upper end of said inner wall being positioned below the upper end of the tank side wall and above the level of liquid within the tank, the lower end of said inner wall being positioned above the tank bottom wall and said inner wall having a liquid transferring opening therein so that said inner wall provides a fixed influent well; means for introducing into said tank through said liquid transferring opening a liquid having settleable and floating material therein, said settleable material falling to the bottom of the tank and said floating material rising to the top of the tank; means for collecting and removing floating material from the top of said tank, said collecting and removing means including an upwardly open trough mounted in said tank adjacent the upper end thereof and extending from adjacent the side wall toward the center of the tank, the radially inner end of said trough projecting inwardly of said inner wall for removing floating material from said influent well, the upper end of said trough being positioned adjacent the level of liquid in said tank and said trough including side walls extending upwardly from a bottom wall and downwardly inclined flanges extending from an upper edge of said trough side walls, said flanges being tapered and converging toward said inner wall; support means on said tank; and means for withdrawing scum from said trough including radially extending blade means mounted on said support means for rotation within said tank, said blade means extending from above to below said liquid level for transporting floating material circumferentially of said tank and into said trough during rotation of said blade means, said blade means being positioned to engage said flanges and pass over said trough to direct scum into said trough.

* * * * *